H. Mewes,
Mower.

No. 104,978.   Patented July 5, 1870.

2 Sheets. Sheet 1.

Witnesses.

Inventor.
Henry Mewes,
by Prindle & Dyer
Attys.

H. Mewes,
Mower.
No. 104,978.  Patented July 5, 1870.
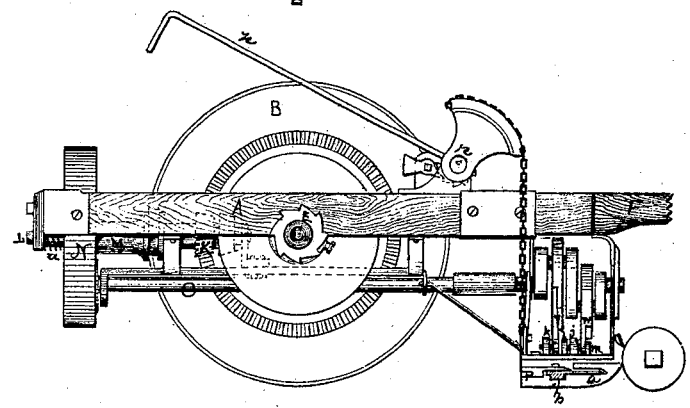

UNITED STATES PATENT OFFICE.

HENRY MEWES, OF BINGHAMTON, NEW YORK, ASSIGNOR TO JOHN W. CUTLER, OF SAME PLACE.

IMPROVEMENT IN HARVESTERS.

Specification forming part of Letters Patent No. 104,978, dated July 5, 1870.

*To all whom it may concern:*

Be it known that I, HENRY MEWES, of Binghamton, in the county of Broome and State of New York, have invented certain new and useful Improvements in Harvesters; and do hereby declare the following to be a full, clear, and exact description thereof, reference being had to the accompanying drawing, making a part of this specification, in which—

Figure 1:
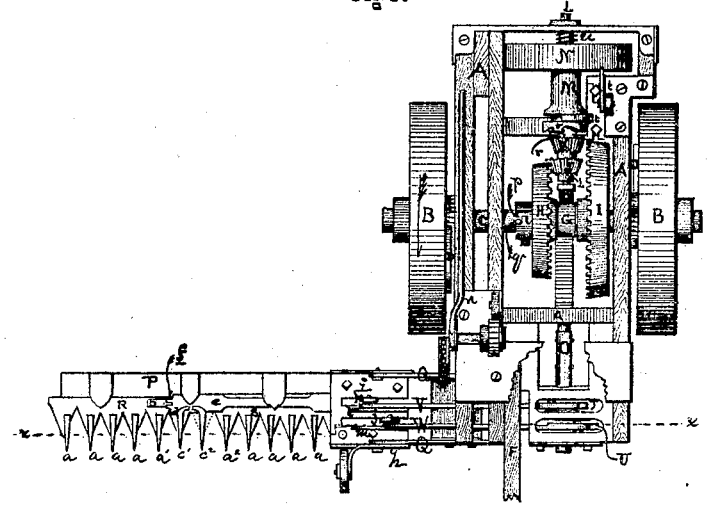
Figure 2:
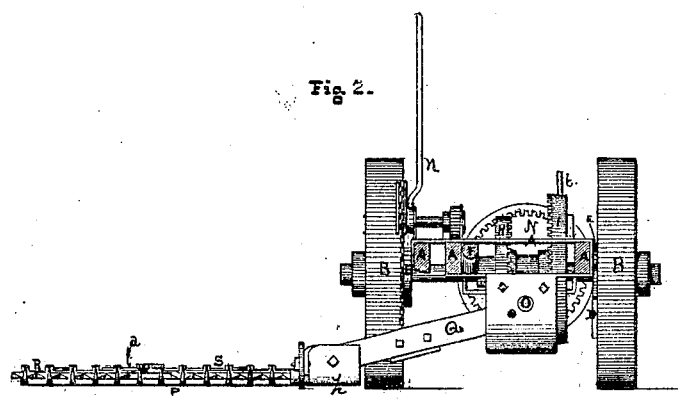
Figure 3:
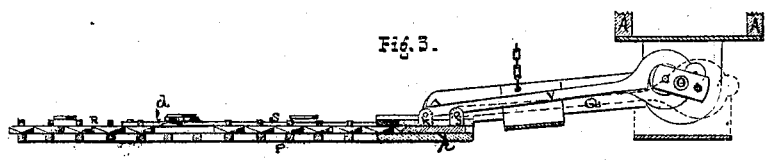

Figure 1 is a plan view of my invention. Fig. 2 is a front elevation of the same. Fig. 3 is a sectional elevation on the line $x\ x$, Fig. 1. Fig. 4 is an inner-side elevation, the wheel being removed. Fig. 5 is an enlarged plan of counter-shaft and gear. Fig. 6 is an enlarged plan of the pitman which drives the outer section of cutters; Figs. 7 and 8, plans of cutter-sections; Figs. 9, 10, 11, 12, plans and elevations of the retaining guide-plates for the cutters. Fig. 13 is a plan view of the crank-box; and Figs. 14 and 15 are detached views of the coupling-pawls upon the main driving-wheels.

Letters of like name and kind refer to like parts in each of the figures.

This invention relates to that class of harvesters known as "double-hinge" machines; and it consists, first, in a harvester in which the cutter-bar is divided to form two independent sections, the employment of a supplementary cutter, arranged to operate between the sections, as is hereinafter specified; second, in combination with said sectional cutter-bar and the supplemental cutter, the narrow central fingers, as is hereinafter shown and described; third, in the employment of a jointed connecting-rod for operating the outer sections of the divided cutter-bar, as is hereinafter set forth; fourth, in the construction and arrangement of the devices for shifting the driving-gear and for locking the same in place, as is hereinafter shown; fifth, in the construction and operation of the automatic reversing-clutch, as is hereinafter shown and described.

Machines have heretofore been constructed with the cutter-bar divided in two sections, each being driven by an independent pitman and separate crank; but there was a space necessarily left between the adjacent ends of the two sections, and this space was covered by a wide guard or divider, by which the standing crop was separated and turned aside far enough to be severed by the cutters of the sections. By this arrangement extra labor was thrown upon the adjacent end cutters of the two sections, and the wide divider caused the crop over which it passed to be cut farther from the ground than that cut by the middle cutters.

To obviate the difficulties above referred to, and especially to equalize the labor of the cutters, I have placed a supplemental cutter upon the connecting-rod, which drives the outer section of cutters, and in place of a wide divider between said cutters I have placed narrow fingers of peculiar construction, against which said supplemental cutter acts.

In the annexed drawing, A A is the main frame, and B B the driving and supporting wheels. The wheels B turn upon the axle C, and are coupled therewith, when moving forward, by the ratchets and pawls D E in the usual manner.

F is the draft-pole or tongue to which the team is attached.

The driver's seat is located upon the machine in any convenient position.

Upon the axle C is mounted a long sleeve, G, fitted to revolve freely upon said axle. At each end of said sleeve is a bevel-driver, H I, of different diameters, and facing each other.

The bevel-wheels H I are arranged to gear with the pinions J K mounted upon the counter-shaft L, which has its bearings suitably disposed upon the main frame. There is also mounted upon the shaft L a long sleeve, M, and large internal driver N, by which motion is communicated to the cutter crank-shaft O.

The finger-bar P is connected with the main frame by means of the double-jointed coupling-arm or frame Q, so that the cutting apparatus can freely conform to the undulations of the ground independent of the motions of the main frame.

The cutters are formed in two sections, R and S, which move simultaneously and in opposite directions, actuated by the opposed cranks T U of the shaft O and pitmen V W.

The finger-bar P is provided with fingers $a$ and a longitudinal groove, $b$, for a guideway for the cutter, as usual.

The two sections R S move in the groove $b$, and as they move simultaneously and in opposite directions it is evident that when each is at its farthest outward extension there will be a vacant space between equal to twice the throw of the crank—that is, equal to twice the distance between the adjoining guards $a$ $a$.

In Fig. 1 the cutters are represented in their greatest outward extension. The end cutter of the section R is at the finger $a^1$, and the end cutter of section S is at finger $a^2$; but when at their greatest inward elongation they will reach the fingers $c^1$ $c^2$, so that it will be evident that any of the crop which shall come between said fingers $c^1$ $c^2$ would not be cut by the cutters of either R or S. This space has therefore been hitherto covered by a wide divider, which would turn the crop aside to be cut between the fingers $a^1$ $c^1$ and $c^2$ and $a^2$.

For reasons hitherto stated I employ in place of a wide tooth or divider the two narrow fingers $c^1$ $c^2$ and the supplemental cutter $d$, preferably secured to the connecting-rod or inner end of the section R. This supplemental cutter has its cutting-edge upon the upper side, so that it cuts against the edges of the caps of the fingers $c^1$ $c^2$, and as the opposite sections move forward it passes under the cutter $d$, as shown in Figs. 2 and 3.

The caps of the fingers $c^1$ $c^2$ extend farther to the rear than the caps of the fingers $a$, and are curved toward each other, so as to draw the crop and hold it to the cutter while being severed.

Heretofore the cutter-bar for the outer section, R, has been rigidly attached to the rod connecting said section to the driving-pitman. This is objectionable, because the torsion of the finger-bar is frequently sufficient to cause said connecting-rod to bind, and thus materially increase the labor required to drive the cutters. This is entirely obviated by jointing the connecting-rod $e$ to the section R at the outer end of said rod $f$.

The rod $e$ lies upon the upper surface of the section S, and the guide-lugs $g$ $g$ are fashioned, as shown in Figs. 9, 10, 11, 12, so as to retain both sections and the rod $e$ securely in position, while permitting them to move freely in their reciprocations.

Secured to the top of the shoe $h$ is a slotted guide and retaining-plate, $i$, and the joint-lugs $j$ $k$ of the section S and connecting-rod $e$ project upward through the guide-slots in said plate to engage with the outer ends of the pitmen V W. The joint at this point is formed by a simple right-angle wrist, or in any other way desired, and the parts are retained in proper contact by the retaining-plates $l$ $m$, secured to the plate $i$.

The boxes at the crank ends of the pitmen V W are formed of two parts, hinged together, as shown in Fig. 13. The most rapid wear is experienced in this crank-joint, and it is therefore necessary that the box should be adjustable, to compensate in a greater or less degree for said wear.

The box being constructed of two parts, hinged together at one side and secured together at the other by an adjusting-screw, permits the attendant to tighten up the crank-bearing at any time to compensate for lost motion.

The cutting apparatus may be raised from the ground to clear obstructions or for transportation by means of the lever $n$ and its connecting-chain, and it may be retained in its elevated position by a ratchet and pawl, in the usual manner.

When the machine is to be transported for any considerable distance the cutting apparatus may be folded over upon the front end of the main frame, which result is accomprished without difficulty by bringing the pitman-joints in line with each other and with the coupling-arm joints, so as to permit the finger-bar to be folded, as described.

To mow in grass of different kinds or qualities, or to adapt the mowing-machine to the cutting of grain, it is required to move the cutters at different speeds. I have therefore arranged the bevel-drivers H I, having different diameters, as alternatives to drive the cutter's crank-shaft. These bevel-wheels are set upon the sleeve G, which may move endwise upon the axle C sufficiently far to enable either one of said wheels to mesh with its pinion J or K. The drivers H I necessarily always move in the same direction, and are never required to revolve backward, and it is therefore possible to keep them properly engaged with their pinions by means of a notched slot, $p$, and pin $q$. The axle C revolves in the direction of the arrow on the wheel B, and the pin $q$ is therefore always pressed forward into one of the notches of the slot $p$, and it is impossible for the wheel to become disengaged while the machine is in operation. To shift the wheels H I, it is only necessary to revolve them backward with the hand far enough to clear the pin $q$ from its notch, when the sleeve G may be caused to slide on the axle and bring the other wheel into engagement with its pinion.

When the machine is being removed from place to place the driving machinery is thrown out of gear by sliding the sleeve M backward on the shaft L, so as to disengage it from the clutch-pin $r$, which is done by means of an ordinary clutch-lever, $t$. The spring $u$ prevents any accidental disengagement by pressing the sleeve M always toward the clutch-pin $r$.

When the wheel I is in gear with the pinion K the wheel N and crank-shaft are revolved in a direction opposite to that in which they revolve when driven by the wheel H; and to avoid all danger from sudden starts or stoppages, and provide a clutch that shall operate automatically in one direction, I make in the end of the sleeve M notches $v$, which present faces in opposite directions, as clearly shown in Fig. 5, so that when the driving-wheel is changed and the motion reversed the shaft L may make a partial revolution independent of the sleeve M—that is, while the pin $r$ is passing from one notch to the other. By these means the connection is made yielding when the machine is backed or the motion is reversed from any other cause.

When the machine is moving on a curved line one wheel and the axle C will run faster than the other, and when the machine is caused to back the wheels should revolve without turning the axle. To accomplish these desirable results it is necessary to employ ratchets and pawls D E, by means of which the wheel is disengaged from the axle and mechanism except when revolving forward.

It is desirable, in addition to the above, that the wheels should be capable of being disengaged, so as to revolve forward without revolving the axle when the machine is passing from place to place. I therefore construct my pawl D with a rigidly-attached spring, $w$, which bears against the front side of the pin $y$ and keeps the pawl always pressed into the ratchet.

Where it is desirable to permanently withdraw the pawl from contact with the ratchet the spring is drawn over to the rear side of the pin $y$. These operations are clearly shown in Figs. 14 and 15.

The principle and operation of the divided cutter-bar, whose sections move simultaneously in opposite directions, are not covered by this specification and claims, said features having been withdrawn and embodied in a separate application.

Having thus fully set forth the nature and merits of my invention, what I claim as new, and desire to secure by Letters Patent, is—

1. In combination with a harvester-cutter divided to form two independent sections and arranged upon the finger-bar, as set forth, the supplementary cutter $d$, arranged to operate between the sections, substantially as described.

2. Also, in combination with a cutter divided in two sections and provided with a supplemental cutter, $d$, as set forth, the fingers $c^1$ and $c^2$, constructed and arranged as described.

3. Also, the jointed connecting-rod $e$, in combination with the section R and pitman V, substantially as and for the purpose set forth.

4. Also, the shifting drivers H and I, mounted upon the same sleeve and provided with the notched slot $p$, in combination with the stop-pin $q$, substantially as shown.

5. Also, the automatic reversing-clutch $v$, provided with notches facing in opposite directions and engaging with the pin $r$, substantially as and for the purpose set forth.

HENRY MEWES.

Witnesses:
GEO. W. MABEE,
ALEX. F. ROBERTS.